United States Patent [19]

Nye et al.

[11] 3,737,264

[45] June 5, 1973

[54] APPARATUS FOR MAKING AND MARKING ELONGATED PLASTIC ARTICLES

[75] Inventors: Norman H. Nye, Cuyahoga Falls; Arthur T. Medkeff, Akron, both of Ohio

[73] Assignees: Nicholas Creme; Cosma Creme, Tyler, Tex.

[22] Filed: June 7, 1971

[21] Appl. No.: 150,350

[52] U.S. Cl. ..................425/134, 425/99, 425/120, 425/259
[51] Int. Cl. ................................................B29f 3/12
[58] Field of Search.......................425/134, 259, 99, 425/98, 120

[56] References Cited

UNITED STATES PATENTS

| R14,651 | 5/1919 | Lanier | 425/99 X |
| 412,230 | 10/1889 | Baird et al. | 425/98 |
| 1,047,122 | 12/1912 | Pohlig | 425/99 X |

*Primary Examiner*—H. A. Kilby, Jr.
*Attorney*—Oldham & Oldham

[57] ABSTRACT

A machine for molding elongated plastic articles with contrasting markings along the length of the article. The machine includes an endless conveyor carrying a series of open topped molds having elongated mold cavities, apparatus for applying dots of a first plastic material at spaced intervals in each mold cavity, and apparatus for filling each mold cavity with a second plastic material. The apparatus for applying the first material includes a wire mounted on a rocker arm and controlled by suitable cams to dip alternately into a tank containing the first plastic material and into the mold cavity to deposit the drop of material in the cavity. The cams are controlled in synchronization with the conveyor movement and include a cam for holding the wires in an inoperative position during the interval after one mold cavity has moved past the wires and before the next mold cavity reaches the wires.

12 Claims, 14 Drawing Figures

INVENTORS
NORMAN H. NYE
ARTHUR T. MEDKEFF
BY OLDHAM & OLDHAM
ATTORNEYS

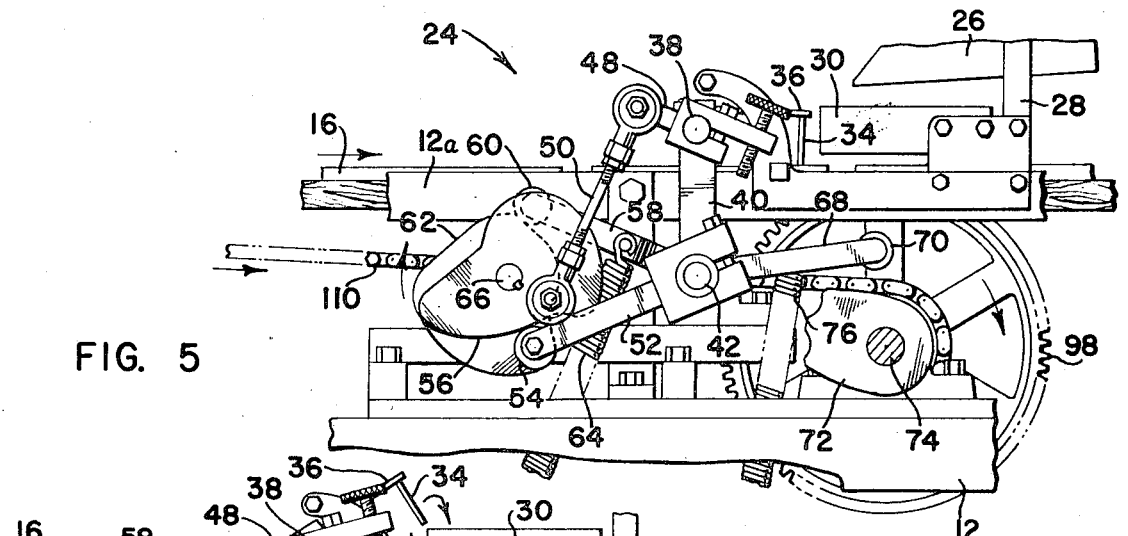
FIG. 5
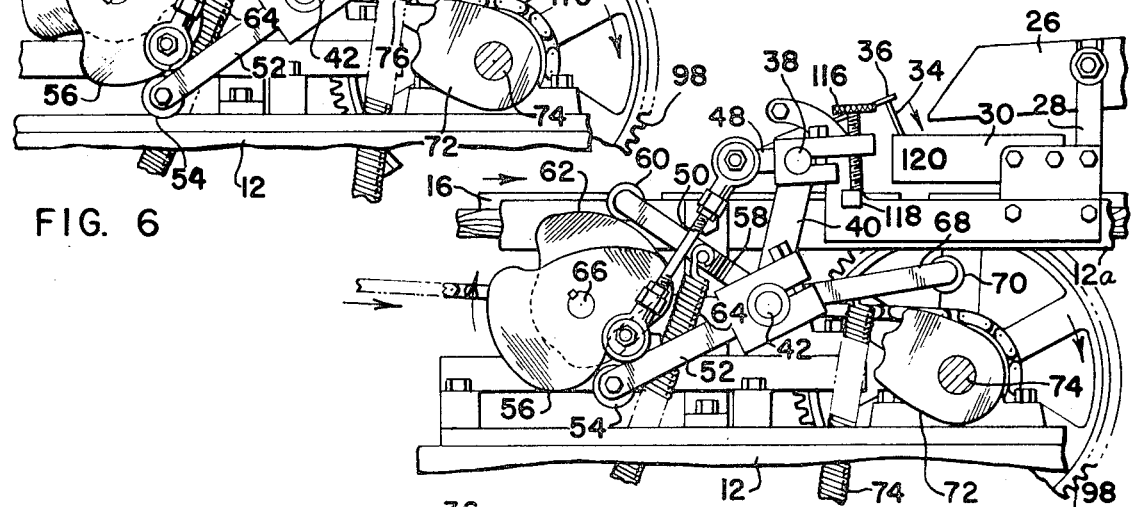
FIG. 6
FIG. 7
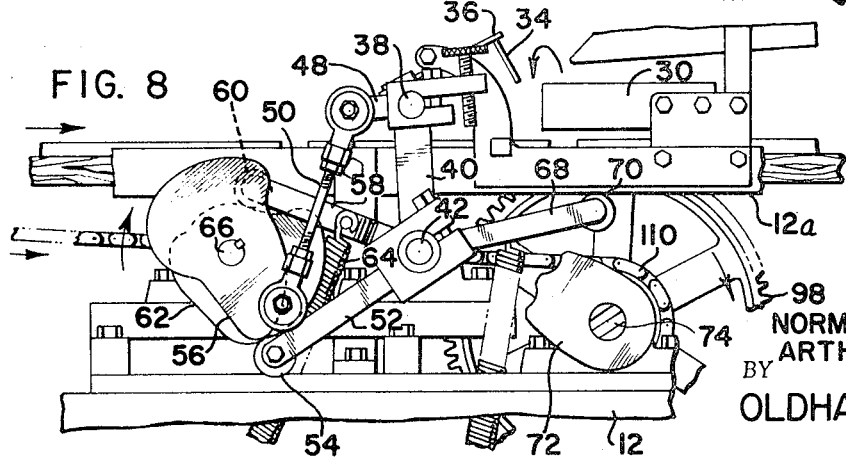
FIG. 8
INVENTORS
NORMAN H. NYE
ARTHUR T. MEDKEFF
BY OLDHAM & OLDHAM
ATTORNEYS

INVENTORS
NORMAN H. NYE
ARTHUR T. MEDKEFF
BY
OLDHAM & OLDHAM
ATTORNEYS

PATENTED JUN 5 1973 3,737,264
SHEET 5 OF 5
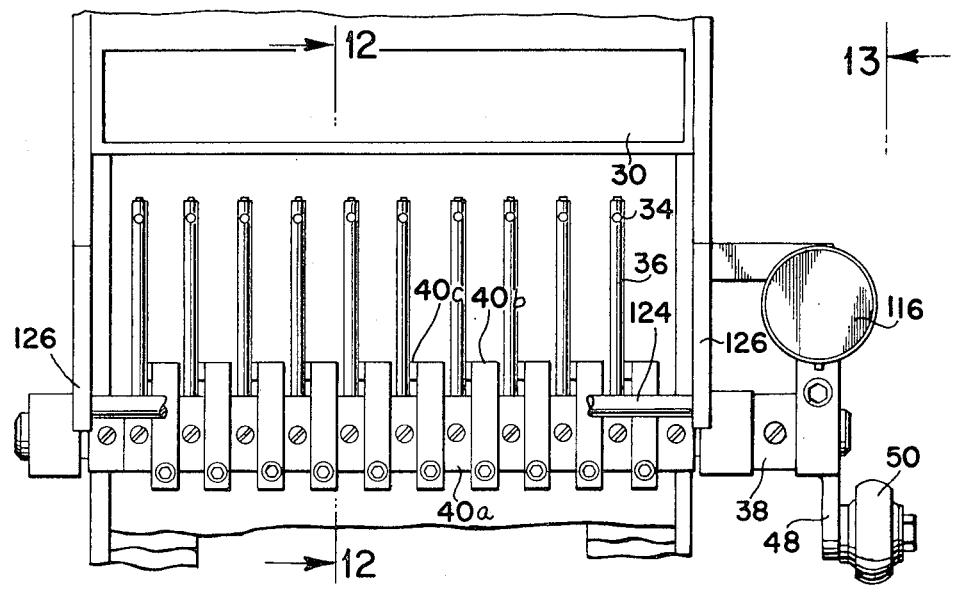
FIG. 11
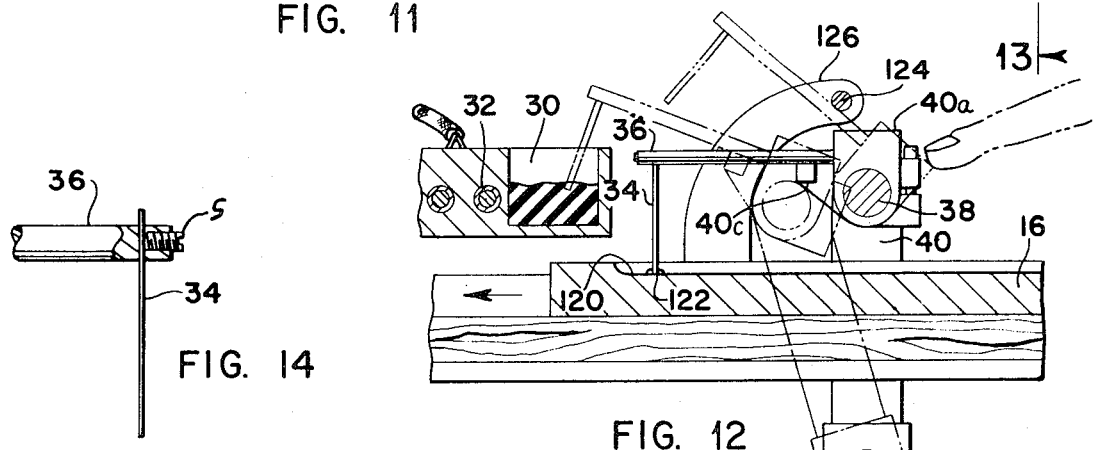
FIG. 14
FIG. 12
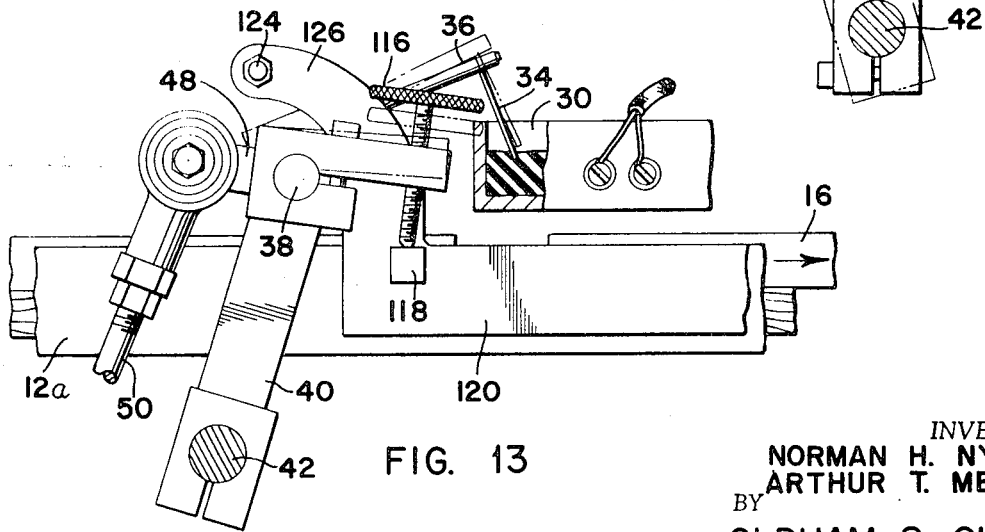
FIG. 13
*INVENTORS*
NORMAN H. NYE
ARTHUR T. MEDKEFF
BY
OLDHAM & OLDHAM
ATTORNEYS

APPARATUS FOR MAKING AND MARKING ELONGATED PLASTIC ARTICLES

In U.S. Pat. No. 3,060,499, granted Oct. 30, 1962 for APPARATUS FOR MAKING ELONGATED PLASTIC ARTICLES there is disclosed a machine for forming elongated articles, such as artificial night crawlers, fishing worms and the like. The machine includes a conveyor for continuously moving a plurality of molds each of which has a number of elongated molding grooves formed in its upper face, apparatus for feeding a melted but viscous thermoplastic material into the mold grooves, and a cam, cam follower arrangement for controlling the plastic feeding apparatus.

The present invention constitutes an improvement of the apparatus disclosed in the above Patent and provides means for applying a series of markings along the length of the molded article to give the article a more realistic appearance.

It is the primary object of the present invention to provide automatic apparatus for applying small quantities of a first thermoplastic or other marking material at spaced intervals along an open elongated mold cavity in conjunction with apparatus for filling the mold cavity with a second, contrasting thermoplastic material.

Another object is the provision of apparatus of the character described which is relatively inexpensive, rapid in operation, requires a minimum of operator attention, and which is durable and long-wearing.

The above and other objects of the invention which will become apparent in the following detailed description are achieved by providing molding apparatus which consists, essentially, of an endless conveyor, a plurality of molds carried by the conveyor and each having a number of elongated open mold cavities on its upper surface, a supply tank holding a first thermoplastic material, a dipper wire associated with each cavity of the mold, the dipper wires being carried by rocker arms which are affixed to a rocker shaft, cam means for moving the rocker arms and dipper wires thereon to move the wires alternately into and out of the first supply tank and into and out of the mold cavity, and apparatus for subsequently filling the mold cavity with a second thermoplastic material.

For a more complete understanding off the invention and the objects and advantages thereof reference should be had to the following detailed description and the accompanying drawings wherein there is shown a preferred embodiment of the invention.

In the drawing:

FIGS. 5 – 8 are fragmentary side elevational views of the marking applying mechanism of the assembly of FIG. 1, showing the realtive positions of the various components in successive stages of the marking operation;

FIG. 11 is a top plan view of the assembly of FIG. 10; and

FIG. 12 and FIG. 13 are fragmentary sectional views taken along the lines 12—12 and 13—13, respectively, of FIG. 11; and FIG. 14 is a detailed view of the clip finger means.

Figure 1:
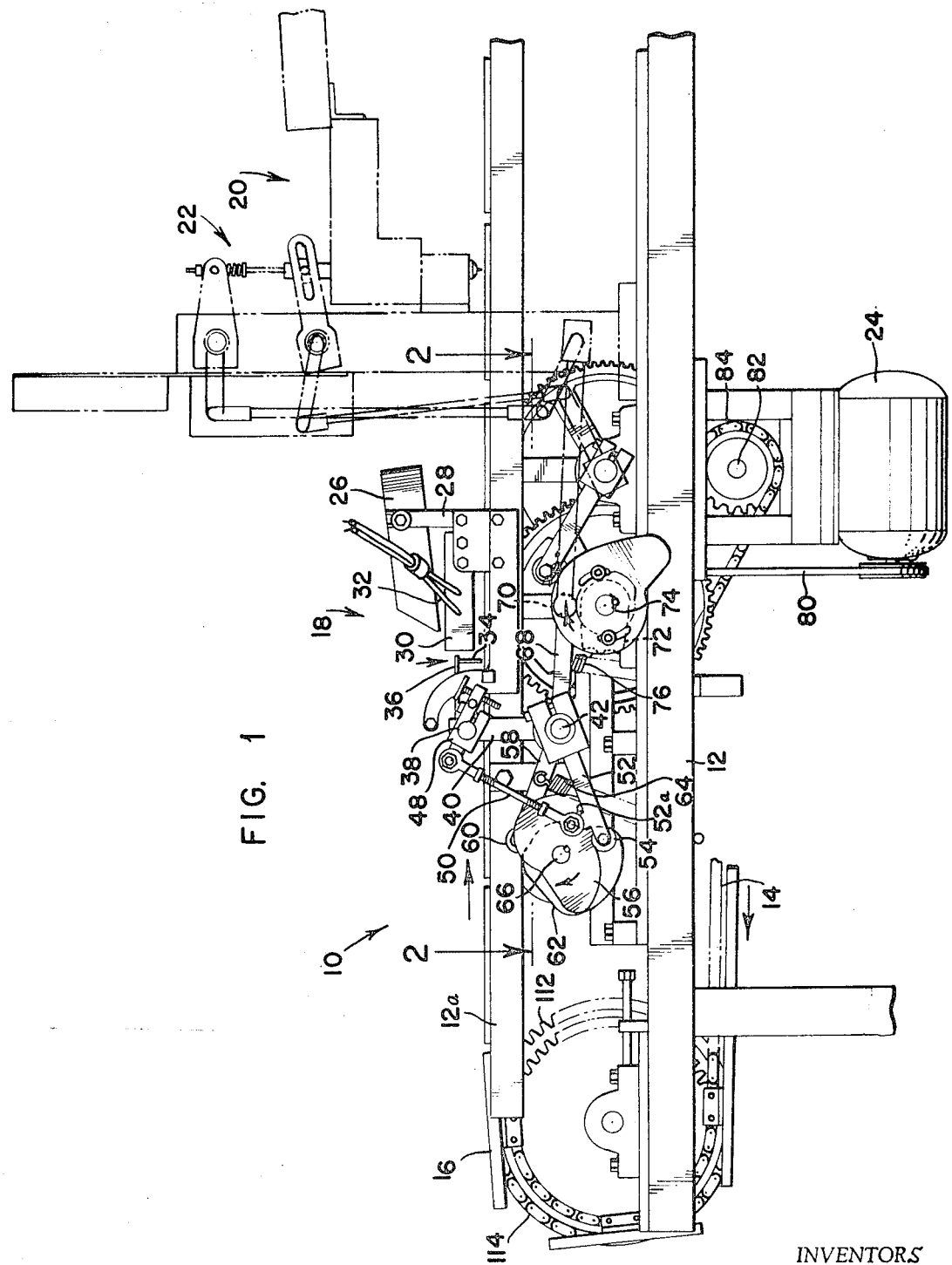
FIG. 1 is a fragmentary side elevational view of the apparatus of the present invention.

Referring now to FIG. 1 the molding apparatus is designated generally by the reference numeral 10 and includes a frame 12, an endless conveyor 14, a plurality of molds 16 each of which has a number of elongated open mold grooves on its upper surface, apparatus 18 for applying dots of a first thermoplastic material to the mold cavities, a supply of a second thermoplastic material 20, a dispensing mechanism 22 for filling the mold cavities with the second material, and a drive motor 24. The operation and construction of the conveyor 14, the molds 16, the supply means 20 and the dispensing mechanism 22 are described in greater detail in the above-mentioned patent and reference should be had thereto for a complete understanding of the construction and operation of this portion of the assembly. The mechanism 22 is controlled by cams driven in synchronization with the conveyor drive means to measure and dispense a quantity of thermoplastic material into each mold cavity as the cavity passes beneath the assembly 22.

Figure 10:
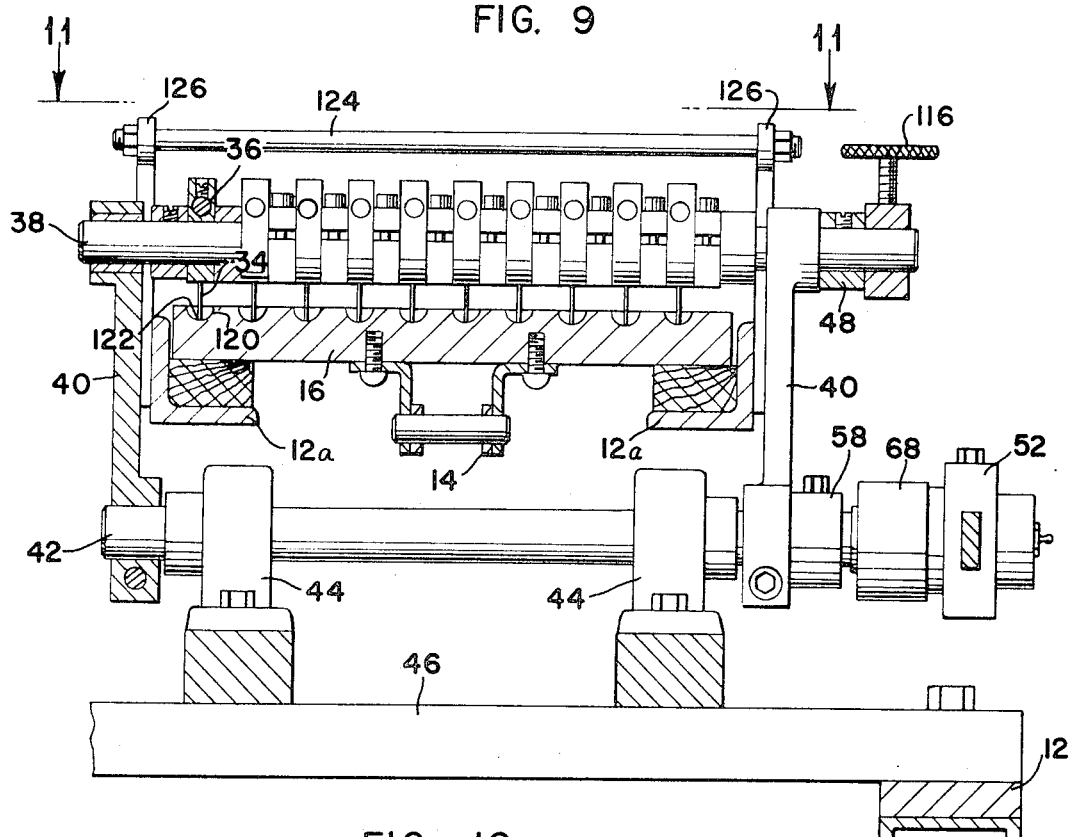
FIG. 10 is a fragmentary sectional view taken along the line 10—10 of FIG. 9.

The mechanism 18 for supplying small quantities of the thermoplastic material at spaced intervals in the mold cavity will now be described. A hopper 26 supported by suitable brackets 28 connected to the upper member 12a of the machine frame 12 receives a quantity of the plastic material and includes heating means, not shown, for melting this material. The hopper 26 discharges into an open topped tray 30 which has a heating element 32 operatively associated therewith. Small quantities of melted thermoplastic material in the tray 30 are transferred to the mold cavity by means of dipper wires 34 which are arranged to alternately dip into the tank 30 and into the mold cavity. A dipper wire 34 is provided for each mold cavity of the mold and each of the wires 34 is mounted at the outer or free end of a support arm 36. A support block 40a is provided for each of the wires 34 and the support block pivotally engage a rocker shaft 38. Spacer blocks 40b are carried in alternate relation with the support blocks 40a or the rocker shaft 38. The spacers 40b are rigidly connected to the rocker shaft and each include a finger 40c therefrom to engage the adjacent support arm 36 to limit downward movement of the arm 36 and to lift the arm 36 as the rocker shaft is rotated. As can be seen most cleary from FIG. 10, the rocker shaft 38 is journalled in a pair of arms 40 which are rigidly connected to a shaft 42 carried in suitable bearing blocks 44 mounted on a cross member 46 of the frame 12. A lever arm 48 is affixed to the rocker shaft 38 and is pivotally connected by an adjustable link 50 to an offset 52a of a lever arm 52 which is connected at one end to the lower shaft 42 in freely rotating relation thereto. The opposite end of the lower lever arm 52 is provided with a roller 54 which serves as a cam follower for a dipper cam 56. It will be seen that rotation of the cam 56 by the design thereof causes the rocker arm 38 to move through a limited arc moving the dipper wires 34 up and down. Another lever arm 58 is keyed to the lower shaft 42 and carries a roller 60 at its outer end which engages the surface of a dipper oscillator cam 62. It will be seen that rotation of the cam 62 by the design thereof causes the lower shaft 42 to move through a limited arc, causing the lever arms 40 to move also through a limited arc, moving the rocker arm 38, the support rods 36, and the dipper wires 34 in a generally forward and backward movement. A coil spring 64 is connected to the frame 12 and to the additional lever arm 58 to hold the roller 60 against the profile of the cam 62. It will be noted that the cams 56 and 62 are keyed to a common cam shaft 66 journalled on the frame and thus are rotated in unison. A third lever arm 68 is also keyed to the lower shaft 42. This lever arm 68 carries a roller 70 at its outer end which engages a cam 72. As will be described in more detail below, the cam 72 is keyed to a shaft 74 which rotates at a different rate of speed from the shaft 66. This cam 72 in effect overrides the cam 56 and holds the dipper wires 34 in an inoperative position during the period of time between successive mold cavities passing the wires 34. A coil spring 76 is connected to the lever arm 68 and to the frame 12 to hold the roller 70 against the surface of the cam 72.

Figure 2:
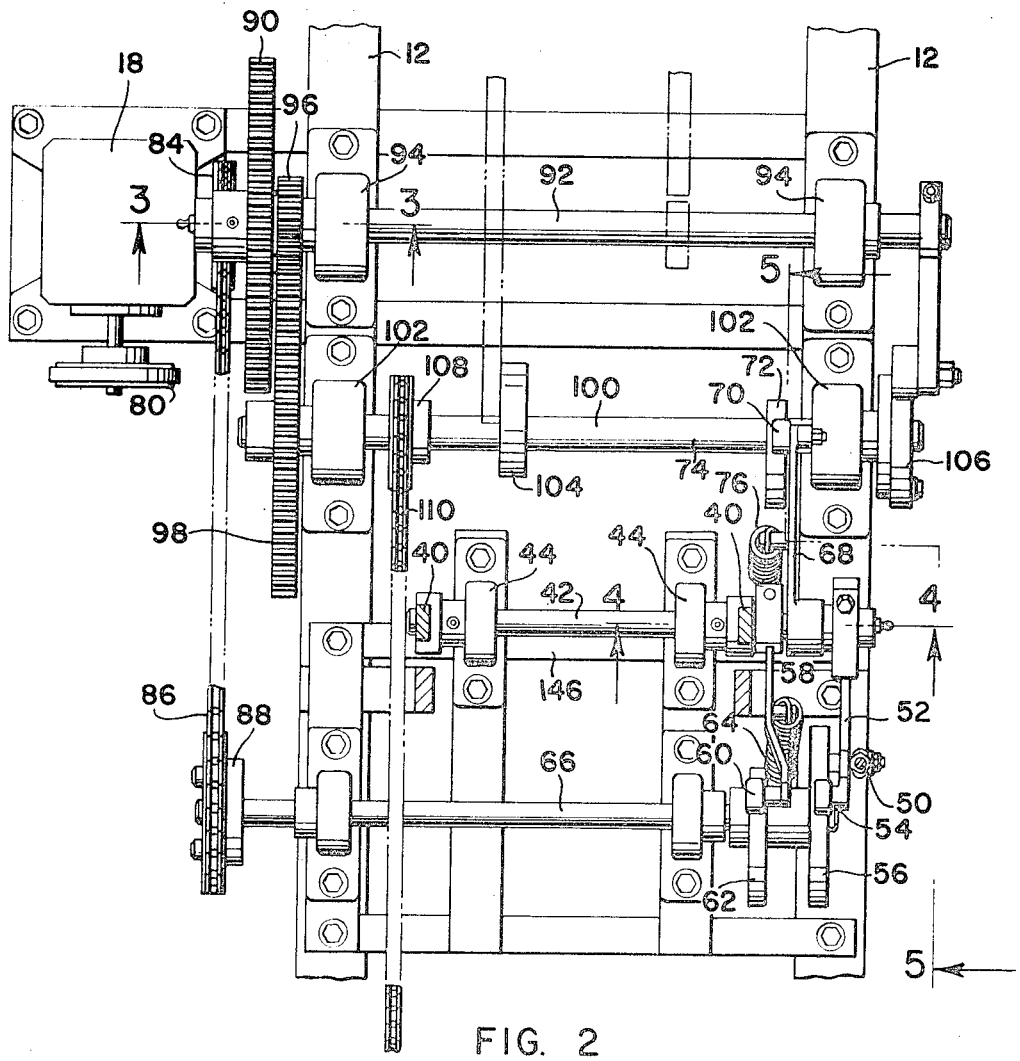
FIG. 2 is a fragmentary transverse view taken along the line 2—2 of FIG. 1.
Figure 3:
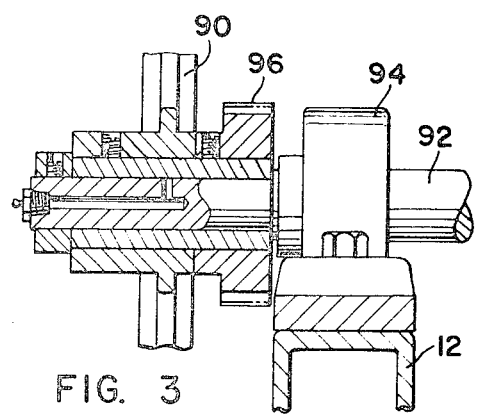
FIG. 3 and FIG. 4 are fragmentary sectional views taken along the lines 3—3 and 4—4, respectively, of FIG. 2.
Figure 4:
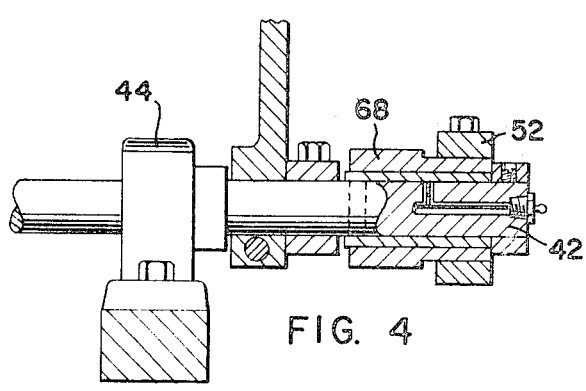

Referring now to FIG. 2, the arrangement for driving both the various cam shafts and the conveyor will now be described. The drive motor 24 drives a gear reducer 78, for example by means of the V-belt 80. The output shaft 82 of the gear reducer 78 carries a sprocket 84 which is connected by means of the endless chain 86 to a sprocket 88 which is keyed to one end of the cam shaft 66 which carries the dipper cam 56 and the dipper oscillator cam 62. The output shaft 82 of the gear reducer 78 also carries a small gear, no shown which is in meshing engagement with a larger gear 90 journalled at one end of a shaft 92 which is supported by suitable bearings 94 mounted on the frame 12. Also journalled on the end of the shaft 92 and rotating with the large gear 90 is a second small gear 96 which is in meshing engagement with a second large gear 98 which is keyed to one end of a shaft 100 which carries the cam 72. The shaft 100 is supported by suitable bearings 102 also affixed to the main frame 12. In addition to the cam 72, cams 104 and 106 are also keyed to the shaft 100. These cams 104 and 106 control the operation of the dispenser mechanism 22, in the manner described in the above mentioned Patent. A sprocket 108 is also keyed to the shaft 100 and drives, by means of the chain 110 and sprocket 112 and endless conveyor chain 114. The sizes of the sprockets 84 and 88 and of the gears 90, 96, and 98 are such that the cam shaft 66 rotates in a ratio of 15 to 1 relative to the cam shaft 100. Other ratios may also be used but, preferably, the speed of the cam shaft 66 is an integral multiple of that of the cam shaft 100.

Referring now to FIGS. 5 – 8, the operating sequence by which a drop of thermoplastic or other marking material is placed in the mold cavity will now be described. Reference should also be had to FIGS. 12 and 13 which illustrate more clearly the relationship of the dipper wires 34 to the reservoir 30 and to the mold 16. FIG. 5 shows th dipper wire 34 inserted into the mold cavity to contact the bottom thereof. Assuming that the wire 34 has been previously dipped into the reservoir 30 a small quantity of thermoplastic material will be carried on the wire and will be deposited as a droplet 122 on the bottom surface of the mold cavity 120. As the cams 56 and 62 continue to rotate th link 50 will be pulled downwardly, causing the support arms 36 to rock with the shaft 38 moving the dipper wires 34 upwardly. At the same time the cam 62 will cause the arm 40 to pivot about the axis of the lower shaft 42 so that the dipper wire is moved toward the reservoir 30. When the dipper wire has reached the reservoir, as shown in FIG. 7, the cam 56 again pulls the connecting link upwardly so that the dipper wire 34 is pushed downwardly into the reservoir, as is shown in solid outline in FIG. 13. A small quantity of the melted thermoplastic material in the reservoir 30 will adhere to the wire. The adjustable screw 116 and stop 118 determine the depth that the wire 34 moves into the thermoplastic material. Further rotation of the cams 56 and 62 causes the dipper wire 34 to move upwardly and away from the reservoir 30. The cycle now repeats, with the dipper wire moving downwardly into the mold cavity to deposit a second drop of the thermoplastic material. Since the molds 16 are moving during the entire operation successively applied drops 122 will be spaced from one another at uniform intervals along the bottom of the mold cavity.

Figure 9:
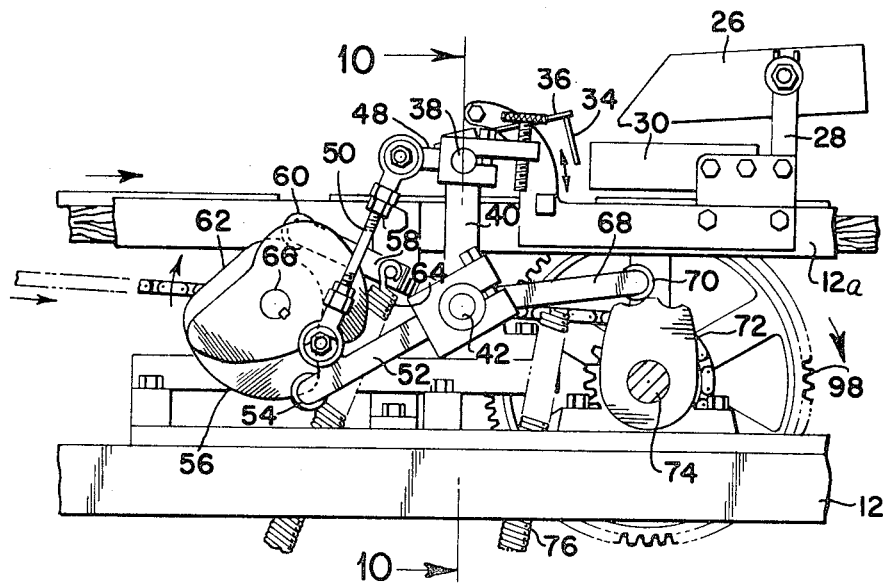
FIG. 9 is a fragmentary elevational view similar to those of FIGS. 5–8 but showing the marking applying mechanism in its inoperative position.

As pointed out previously, the shaft 66 rotates faster than the shaft 74. When the shaft 74 has rotated so that the cam 72 contacts the roller 70, as is shown in FIG. 9, the lever arm 68 moves the arm 52 away from the cam 56 and the dipper wire mechanism is retained in its elevated position above the reservoir 30. Thus, although the wire support means continues to oscillate horizontally due to the cam 62 it does not move either into the reservoir 30 or into the mold cavity. The length of time the cam 72 contacts the roller 70 of the arm 68 corresponds to the length of time between the passage of the trailing edge of one mold cavity and the leading edge of a successive mold cavity so that no material is deposited by the wires during this interval. The speed ratio between the cam shafts 66 and 74 and the interruption of deposit by the cam 72 determines the number of drops which are applied in any one mold cavity.

As can be seen from FIG. 12, the dipper wire 34 and its support arm 36 are freely pivotal on the shaft 38 and may be moved to an upper position by finger pressure so that the dipper wire may be cleaned or inspected. A bar 124 extending parallel to the shaft 138 and supported by brackets 126 provides an upper limit of movement of the support arms 36 and also serves as a guard or protection for the lever arms.

The position of the clip finger or wire 34 on the arm 36 is controlled by a set screw 5 bearing on the wire that extends through a hole in the arm 36.

While specific reference has been made to the use of thermoplastic marking materials such as vinyl resins, it will be understood that other marking materials may be used so long as the material has sufficient viscosity to form a droplet on the dipper wire 34 when the wire is dipped into the supply tank 30. Movement of the wire or droplet carrier is adjusted so that the droplet contacts the mold cavity for deposit therein.

It will be understood that while only the best known embodiment of the invention is illustrated and described in detail herein, the invention is not limited thereto or thereby. Reference should therefore be had to the appended claims in determining the true scope of the invention.

What is claimed is:

1. In apparatus which includes a frame, dispensing means carried by the frame for filling elongated mold cavities with a first material to be molded, and a conveyor for moving the molds along a path past the dispensing means, the improvement comprising a mechanism for applying small quantities of a second, contrasting material to the mold cavities at spaced intervals prior to the filling of the cavities by the dispensing means, the mechanism inlcuding
- an open-topped tank means for holding a supply of the second material in liquid form;
- a dipping means including a small diameter member located above the path of mold movement and adjacent the tank means;
- control means for moving the dipping means to immerse a lower end of the small diameter member into the material in the tank means, raise the member, and then move the dipping means to bring the lower end of the small diameter member into the mold cavity; and
- said dipping means including a first shaft located above and extending transversely of the path of mold movement, the first shaft being located adjacent the tank and said control means include a second shaft extending parallel to the first shaft and journalled on the frame, at least one arm rigidly connected at its first end to the second shaft and journalling the first shaft at its opposite end, at least one rocker arm connected to the first shaft, extending toward the tank, and having said member depending at its end, and cam means for rotating the first and second shafts through arcs to dip the lower end of said member alternately into the tank and into the mold cavity.

2. In apparatus which includes a frame, dispensing means carried by the frame for filling elongated mold cavities with a first material to be molded, and a conveyor for moving the molds along a path past the dispensing means, the improvement comprising a mechanism for applying small quantities of a second, contrasting material to the mold cavities at spaced intervals prior to the filling of the cavities by the dispensing means, the mechanism including
- a supply tank mounted on the frame above the conveyor path;
- a first shaft journalled on the frame;
- a second shaft extending parallel to the first shaft and located adjacent to the supply tank;
- arms rigidly connected at one end to the first shaft and journalling the second shaft thereon at their opposite ends;
- at least one rocker arm carried by the second shaft and extending toward the supply tank;
- a wire carried by and depending from the end of each rocker arm;
- first means including a first cam, a first cam follower, and a first lever arm for rotating the first shaft through an arc;
- second means including a second cam, a second cam follower, and a second lever arm for rotating the second shaft through an arc; and
- means for rotating the first and second cams whereby the wire is alternately dipped into the supply tank moved through an arc and dipped in the mold.

3. Apparatus according to claim 2 wherein the first and second cams are carried by a common shaft and rotate in unison.

4. Apparatus according to claim 3 further including additional means including a third cam, a third cam follower, and a third lever arm for overriding the action of the second cam follower and second lever arm to prevent the wire from dipping to the supply tank or onto th object, the third cam rotating slower than the first cam so that the overriding action occurs only after a predetermined number of dipping cycles have been completed.

5. Apparatus according to claim 4 wherein the speed of rotation of the first and second cams is an integral multiple of the speed of rotation of the third cam.

6. Apparatus according to claim 2 wherein there are a plurality of rocker arms rigidly connected to the second shaft, the rocker cams being aligned with one another.

7. Apparatus according to claim 2 wherein the objects are moved along the linear path by a conveyor, the rotational speeds of the first, second, and third cams being coordinated with the conveyor speed.

8. The improvement according to claim 1 wherein the cam means includes first and second cams rotating in unison, a first cam follower and lever arm associated with the first cam and connected to the first shaft to rotate the first shaft through an arc, and a second cam follower and lever arm associated with the second cam and connected to the second shaft to rotate the second shaft through an arc.

9. The improvement according to claim 8 wherein the cam means further includes a third cam rotating at a slower rate than the first and second cams and a third cam follower and lever arm associated with the third cam and connected to the second shaft to override the action of the second cam.

10. The improvement according to claim 9 wherein the rotation of the cams is synchronized with the conveyor movement.

11. The improvement according to claim 9 wherein the first and second cams rotate at a speed an integral number of times the speed of the third cam.

12. The improvement according to claim 9 wherein the dispensing means is controlled by cams which rotate in unison with the third cam.

* * * * *